(12) United States Patent
Bernhardt et al.

(10) Patent No.: US 9,902,001 B2
(45) Date of Patent: Feb. 27, 2018

(54) TABLE SAW

(71) Applicant: NANJING BOVON POWER TOOLS CO., LTD., Nanjing (CN)

(72) Inventors: Thomas Bernhardt, Nanjing (CN); Seow Bak Chai, Nanjing (CN); Hongbo Li, Nanjing (CN); Xin Wu, Nanjing (CN); Xiaoxiang Zhao, Nanjing (CN)

(73) Assignee: Nanjing Bovon Power Tools Co., Ltd., Nanjing (CN)

( * ) Notice: Subject to any disclaimer, the term of this patent is extended or adjusted under 35 U.S.C. 154(b) by 305 days.

(21) Appl. No.: 14/165,869

(22) Filed: Jan. 28, 2014

(65) Prior Publication Data
US 2014/0216224 A1    Aug. 7, 2014

(30) Foreign Application Priority Data

Feb. 2, 2013 (CN) .......................... 2013 1 0044042
Jan. 20, 2014 (CN) .......................... 2014 1 0027558

(51) Int. Cl.
| | | |
|---|---|---|
| *B23D 19/00* | (2006.01) | |
| *B23D 45/00* | (2006.01) | |
| *B27B 3/28* | (2006.01) | |
| *B27B 5/06* | (2006.01) | |
| *B26D 7/08* | (2006.01) | |
| *B23D 59/02* | (2006.01) | |
| *B28D 1/04* | (2006.01) | |
| *B28D 7/02* | (2006.01) | |
| *B23D 45/06* | (2006.01) | |
| *B27G 19/08* | (2006.01) | |

(52) U.S. Cl.
CPC ............. *B23D 59/02* (2013.01); *B23D 45/06* (2013.01); *B27G 19/08* (2013.01); *B28D 1/04* (2013.01); *B28D 7/02* (2013.01); *Y10T 83/2077* (2015.04); *Y10T 83/263* (2015.04)

(58) Field of Classification Search
CPC ........ B23D 59/02; B23D 45/06; B27G 19/08; B28D 7/02; B28D 1/04; Y10T 83/263; Y10T 83/2077
USPC ................................................ 83/102.1, 169
See application file for complete search history.

(56) References Cited

U.S. PATENT DOCUMENTS 1,824,000 A * 9/1931 Walter .................... B24B 27/06
                                                                  125/13.01
2,413,016 A * 12/1946 Wiken ................. B23D 45/044
                                                                  29/DIG. 68

(Continued)

*Primary Examiner* — Ghassem Alie
*Assistant Examiner* — Bharat C Patel
(74) *Attorney, Agent, or Firm* — Greenberg Traurig, LLP

(57) ABSTRACT

A table saw includes a base, a work table having a cutting opening, a tank for receiving cooling liquid, a blade partly extending out from the cutting opening, and a guard assembly. The guard assembly includes a guard for covering the blade and for moving upwards under the action of a workpiece. In a working condition, at least a portion of the guard abuts against the workpiece, and the workpiece can slide relative to the guard. The guard has a guiding wall which abuts against the workpiece in the working condition and which guides the cooling liquid into a kerf in the workpiece formed by the blade. The table saw effectively controls the cooling liquid splashed during the cutting operation of the workpiece and prevents the cooling liquid from splashing to dirty the operator, the work table, and the workpiece.

18 Claims, 11 Drawing Sheets

(56) References Cited

U.S. PATENT DOCUMENTS

| | | | | |
|---|---|---|---|---|
| 2,431,469 A * | 11/1947 | Eyles | B28D 1/047 | 125/13.01 |
| 2,444,598 A * | 7/1948 | Eyles | B23D 59/02 | 125/13.01 |
| 2,466,325 A * | 4/1949 | Ocenasek | B27G 19/02 | 83/102.1 |
| 2,499,582 A * | 3/1950 | Harrison | B23Q 11/0046 | 29/DIG. 79 |
| 2,572,326 A * | 10/1951 | Evans | B27G 19/02 | 83/102.1 |
| 2,593,596 A * | 4/1952 | Olson | B27G 19/02 | 83/102.1 |
| 2,743,717 A * | 5/1956 | Wilkin | B24B 27/06 | 125/13.01 |
| 2,787,434 A * | 4/1957 | Jacobsen | F21V 21/26 | 248/568 |
| 3,008,462 A * | 11/1961 | Williams | B24B 27/06 | 125/13.01 |
| 3,249,134 A * | 5/1966 | Vogl | B27G 19/02 | 144/251.1 |
| 3,298,097 A * | 1/1967 | Gilbert | A47B 96/202 | 29/564 |
| 3,340,863 A * | 9/1967 | Zuzelo | B28D 1/042 | 125/14 |
| 3,880,032 A * | 4/1975 | Green | B27G 19/02 | 83/102.1 |
| 4,185,609 A * | 1/1980 | Petera | B23D 53/06 | 125/21 |
| 4,406,274 A * | 9/1983 | Ogyu | B23D 47/005 | 125/13.01 |
| 4,418,597 A * | 12/1983 | Krusemark | B26D 7/01 | 144/251.1 |
| 4,910,925 A * | 3/1990 | Longuet | B24B 55/045 | 451/453 |
| 5,097,400 A * | 3/1992 | Cvek | F16M 11/105 | 362/287 |
| 5,327,649 A * | 7/1994 | Skinner | B23D 59/006 | 30/124 |
| 5,586,929 A * | 12/1996 | Butcher | B23D 47/045 | 451/213 |
| 5,590,957 A * | 1/1997 | Chen | F21V 21/26 | 362/419 |
| 5,676,124 A * | 10/1997 | Lee | B28D 1/047 | 125/13.01 |
| RE35,666 E * | 11/1997 | Smith | B23D 47/025 | 125/13.01 |
| 6,000,387 A * | 12/1999 | Lee | B23D 47/025 | 125/11.22 |
| 6,183,527 B1 * | 2/2001 | O'Banion | A47L 5/365 | 15/347 |
| 6,206,762 B1 * | 3/2001 | Bentley | B23D 45/124 | 451/49 |
| 6,253,757 B1 * | 7/2001 | Benson | B23D 47/025 | 125/11.22 |
| 6,422,228 B1 * | 7/2002 | Latham | B28D 7/00 | 125/12 |
| 6,494,198 B1 * | 12/2002 | Chen | B23D 47/025 | 125/13.01 |
| 6,578,460 B2 * | 6/2003 | Sartori | B27G 19/02 | 144/251.1 |
| 6,632,126 B1 * | 10/2003 | Cogswell | B23D 47/123 | 125/13.01 |
| 6,752,140 B1 * | 6/2004 | Fuhrman | B23D 45/02 | 125/13.01 |
| 6,959,632 B2 * | 11/2005 | Lee | B27B 27/06 | 125/13.01 |
| 6,978,529 B1 * | 12/2005 | Pearse | B28D 1/00 | 29/402.08 |
| 7,434,501 B2 * | 10/2008 | Chuang | B27G 19/02 | 144/251.1 |
| 8,650,997 B1 * | 2/2014 | Simon | B23D 47/025 | 83/100 |
| 8,910,552 B2 * | 12/2014 | Hogan | B23D 45/048 | 125/11.22 |
| 2002/0174860 A1 * | 11/2002 | Cullen | B28D 1/042 | 125/13.01 |
| 2005/0205075 A1 * | 9/2005 | Guth | B23Q 11/0046 | 125/13.01 |
| 2005/0211235 A1 * | 9/2005 | Governo | B28D 1/042 | 125/13.03 |
| 2009/0000446 A1 * | 1/2009 | Jeppesen | B23Q 11/005 | 83/169 |
| 2012/0118278 A1 * | 5/2012 | La Banco | B23D 47/025 | 125/35 |

* cited by examiner

TABLE SAW

RELATED APPLICATION INFORMATION

This application claims the benefit of CN 201410027558.9, filed on Jan. 20, 2014, and CN 201310044042.0, filed on Feb. 2, 2013, the disclosures of which are incorporated herein by reference in their entirety.

FIELD OF THE DISCLOSURE

The following generally relates to table saws and, more particularly, to a cooling liquid guiding system for a table saw.

BACKGROUND OF THE DISCLOSURE

A table saw can be used for cutting materials such as porcelain tile, ceramic tile, and so on. As shown in FIG. 1, a conventional table saw mainly comprises a base 11, a work table 12 supported on the base 11, a tank 13 arranged below the work table 12 for accommodating a cooling liquid, a blade 14 driven by a motor, and a guard assembly 15 mounted on the base 11.

During the cutting operation, the blade 14 is driven by the motor to perform a high-speed rotating motion, and a workpiece is positioned on the work table 12. Then the workpiece is pushed toward the blade 14 gradually by the operator to perform the cutting operation. When the blade 14 rotates at high speed, the cooling liquid in the tank 13 will be brought to a cutting area on the work table 12 by the blade 14. Thus, there is a lot of cooling liquid splashing around the cutting edge of the blade 14. In the prior art, the guard assembly 15 is used to block the splashing cooling liquid. However, the guard assembly 15 can only cover a part of the blade 14, and there is still another part of the blade 14 exposed. Therefore, the guard assembly 15 can only block a part of the cooling liquid brought by the blade, and most of the cooling liquid will splash to the operator and flow to the work table and the workpiece, as shown by arrows in FIG. 1. As a result, the clothes of the operator would be stained by the cooling liquid brought by the blade. Further, the cooling liquid blocked by the guard assembly falls on the work table or the workpiece, and stains the work table and the workpiece.

SUMMARY

The following describes a table saw that overcomes the deficiencies existing in the prior art and which can effectively prevent the cooling liquid from splashing during the cutting operation.

An exemplary table saw that meets these objectives comprises a base; a work table, for placing a workpiece, supported on the base, the work table having a cutting opening; a tank for accommodating the cooling liquid arranged below the work table; a blade driven by a motor which partially extends out from the cutting opening; and a guard assembly mounted on or adjacent to the work table, the guard assembly comprising a guard element for covering at least a portion of the blade, wherein the guard element comprises an inside wall extending from a center area above the blade to both sides of the guard element outwardly and downwardly; a cooling liquid guiding channel extending along a lower portion of the guard element and descending towards the backend of the guard element; and a discharging opening communicating with the cooling liquid guiding channel, the discharging opening allowing the cooling liquid to flow away from the guard element and go back into the tank through the cutting opening.

In the working condition, at least a portion of the guard of the table saw abuts against the workpiece, and a hollow chamber is formed between the guard and the workpiece. As a result, the cooling liquid brought to the work table when the blade rotates at high speed is controlled into the hollow chamber, and then the cooling liquid cannot splash to the outside of the guard, which effectively controls the splashing of the cooling liquid. Due to the inside wall, the cooling liquid that falls towards the workpiece is guided to the kerf in the workpiece formed by the blade, thus the cooling liquid can get away from the surface of the workpiece via the kerf in the workpiece, which ensures there is no redundant cooling liquid left on the surface of the workpiece.

Preferably, the kerf of the workpiece and the cutting opening of the work table are almost in one line, so the cooling liquid can flow back to the tank for receiving the cooling liquid through the kerf of the workpiece and the cutting opening of the work table. Thus, the described table saw has the function of collecting the cooling liquid brought by the blade and then guiding and returning it to the tank for receiving the cooling liquid through the cutting opening of the work table, which effectively controls the cooling liquid that is splashed during the cutting operation of the workpiece, prevents the cooling liquid from splashing to dirty the operator, the surroundings and the workpiece, saves the time of cleaning the workpiece after the cutting operation, and enhances the operating comfort of the operator.

DETAILED DESCRIPTION

Figure 1:
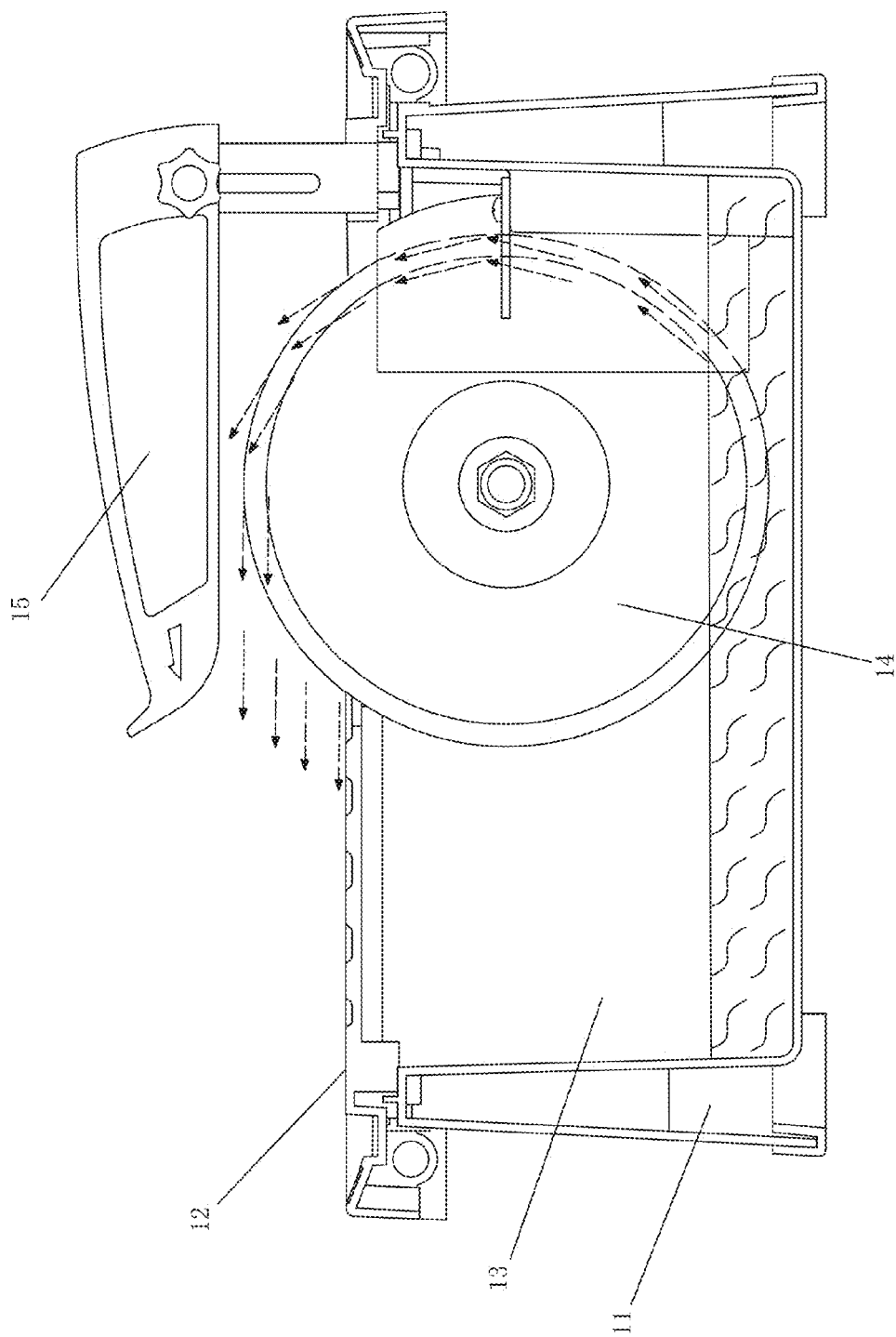
FIG. 1 is a schematic view of a table saw of the prior art.
Figure 2:
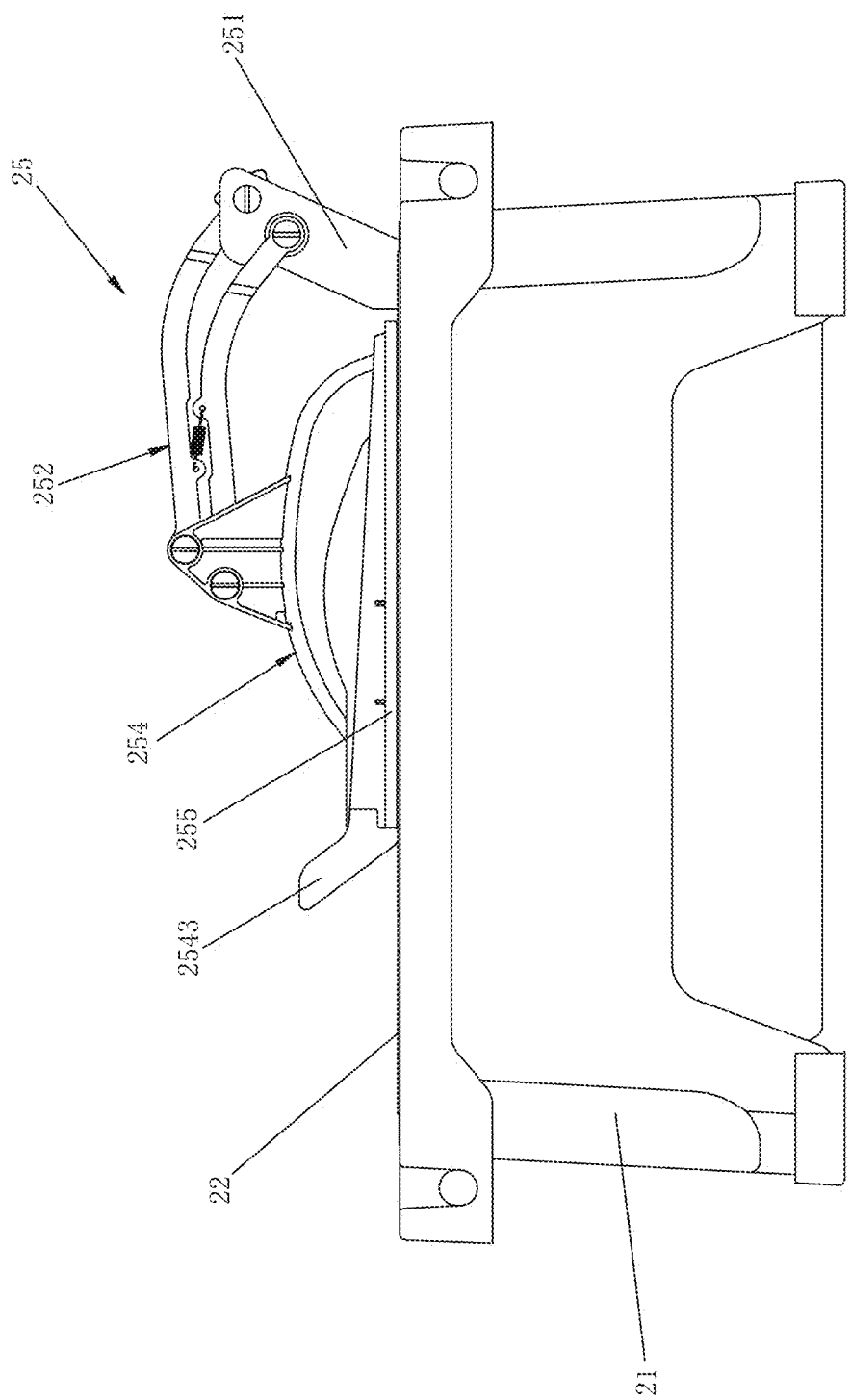
FIG. 2 is a schematic view of an exemplary table saw constructed according to the description which follows in a non-working condition.
Figure 3:
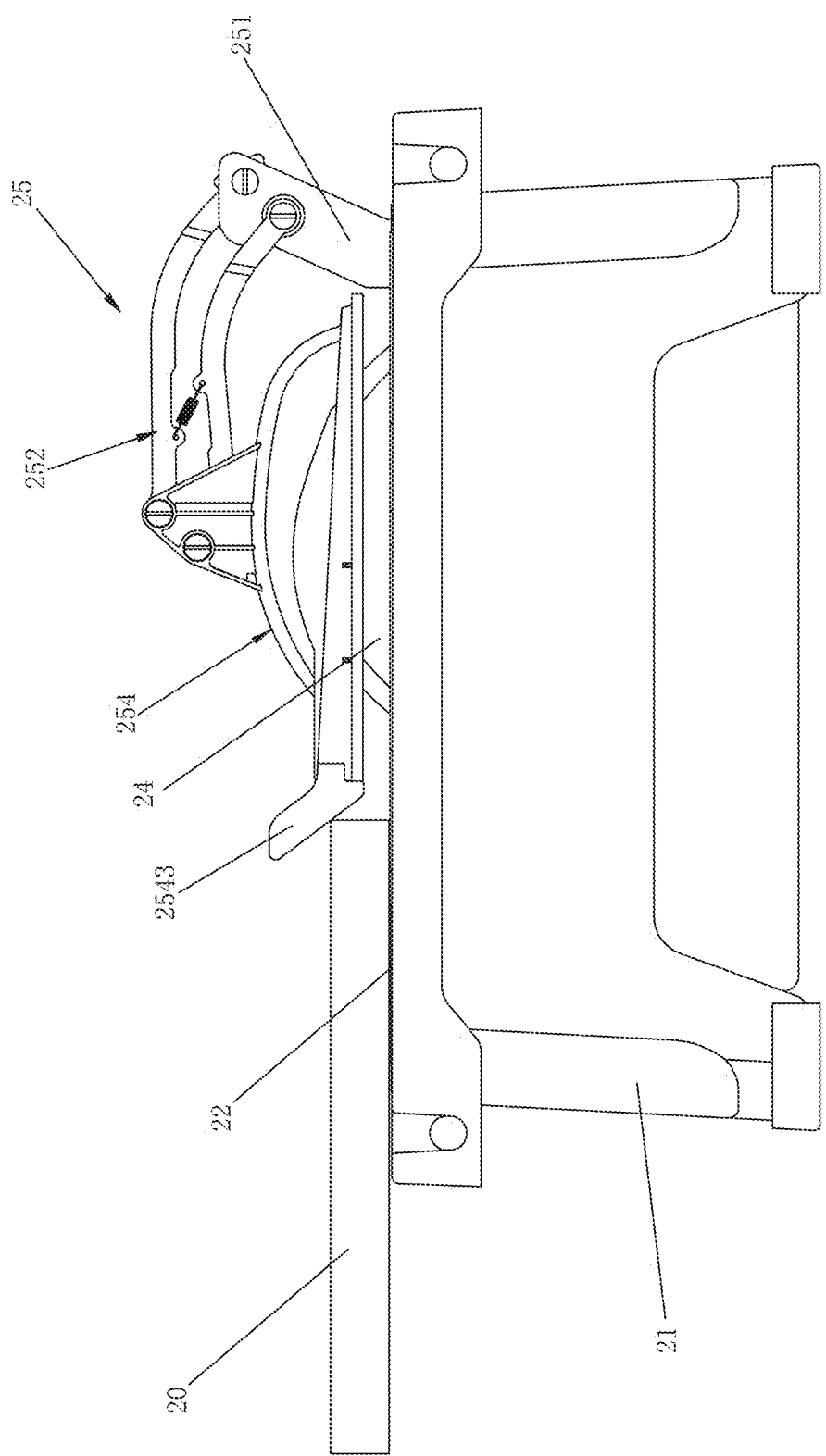
FIG. 3 is a schematic view of the table saw in a working condition.
Figure 6:
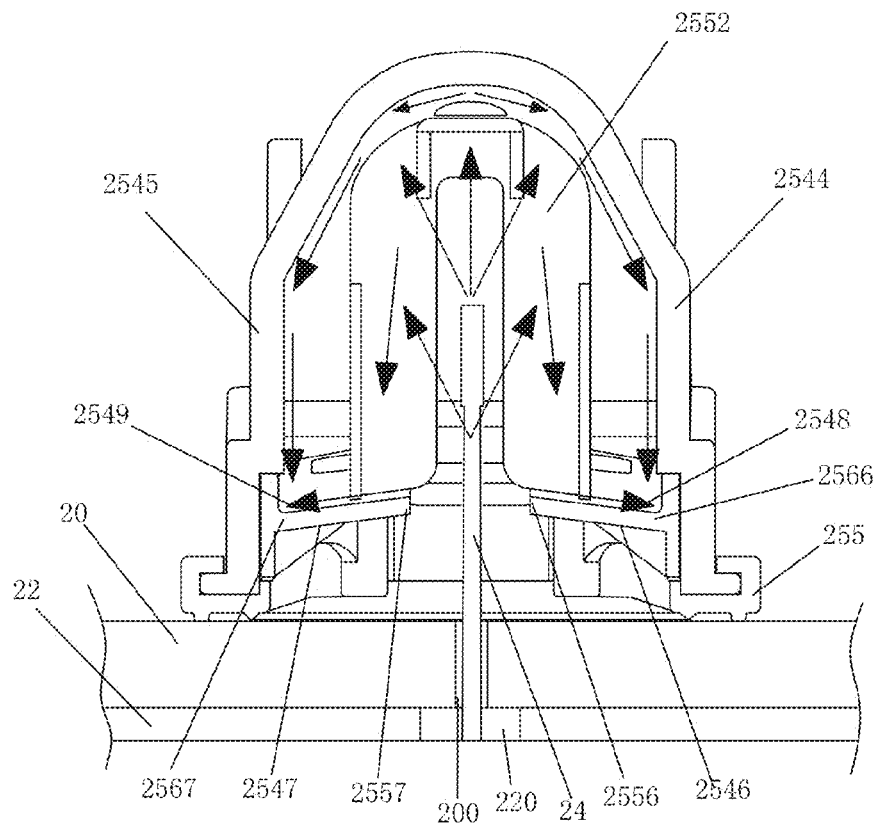
FIG. 6 is a cross-sectional view of the guard assembly of FIG. 4.
Figure 7:
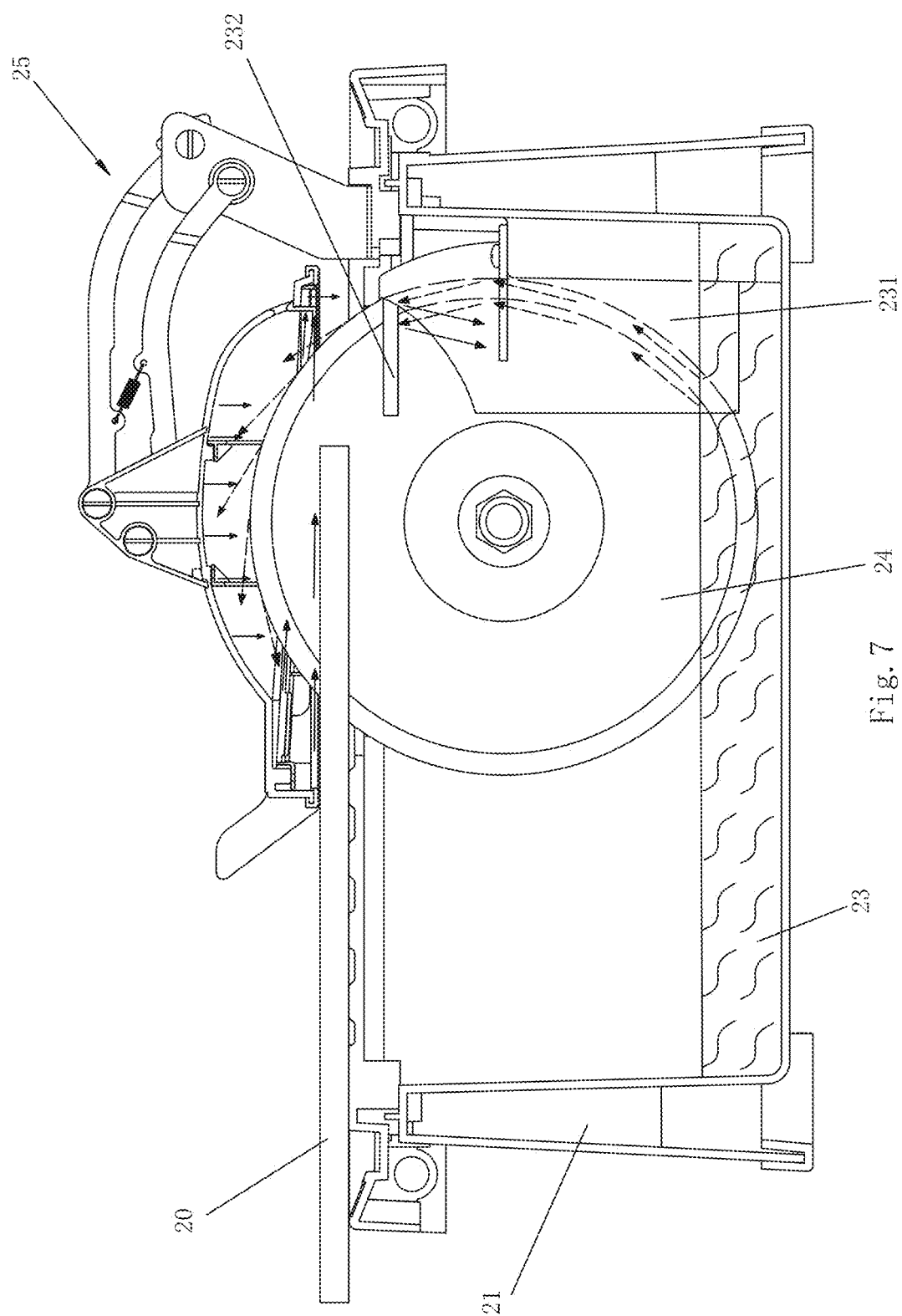
FIG. 7 is a sectional view of the table saw in a working condition.

As shown in FIGS. 2-3, a table saw of the present invention comprises a base 21, a work table 22, for carrying a workpiece 20, supported on the base 21, a tank 23 (as shown in FIG. 7) arranged below the work table 22 for accommodating the cooling liquid, a blade 24 driven by a motor and a guard assembly 25. The guard assembly 25 is capable of being mounted directly on the work table 22 or a component adjacent to the work table 22 and comprises a guard element 254 for covering at least a portion of the blade 24. The work table 22 has a cutting opening 220 (as shown in FIG. 6) from which the blade 24 partially extends out. In a non-working condition, as shown in FIG. 2, the extended portion of the blade 24 is covered by the guard element 254.

The table saw further comprises a cooling liquid guiding system. The cooling liquid brought out of the tank 23 by the blade 24 rotating at high speed can be restrained within the guard element 254 by the cooling liquid guiding system, and then flow out of the guard element 254 for return back to the tank 23 through the cutting opening 220. Thereby the cooling liquid is collected and back flowed. The cooling liquid guiding system comprises the guard assembly 25 for restraining the cooling liquid brought by the blade 24, the work table 22 having the cutting opening 220 and the tank 23 for accommodating the cooling liquid.

The following will describe the structure of the guard assembly 25 being capable of controlling and guiding the cooling liquid brought by the blade.

It should be noted that "frontend" in this description means the end adjacent to the operator during the operation, and "backend" means the end away from the operator.

Figure 4:
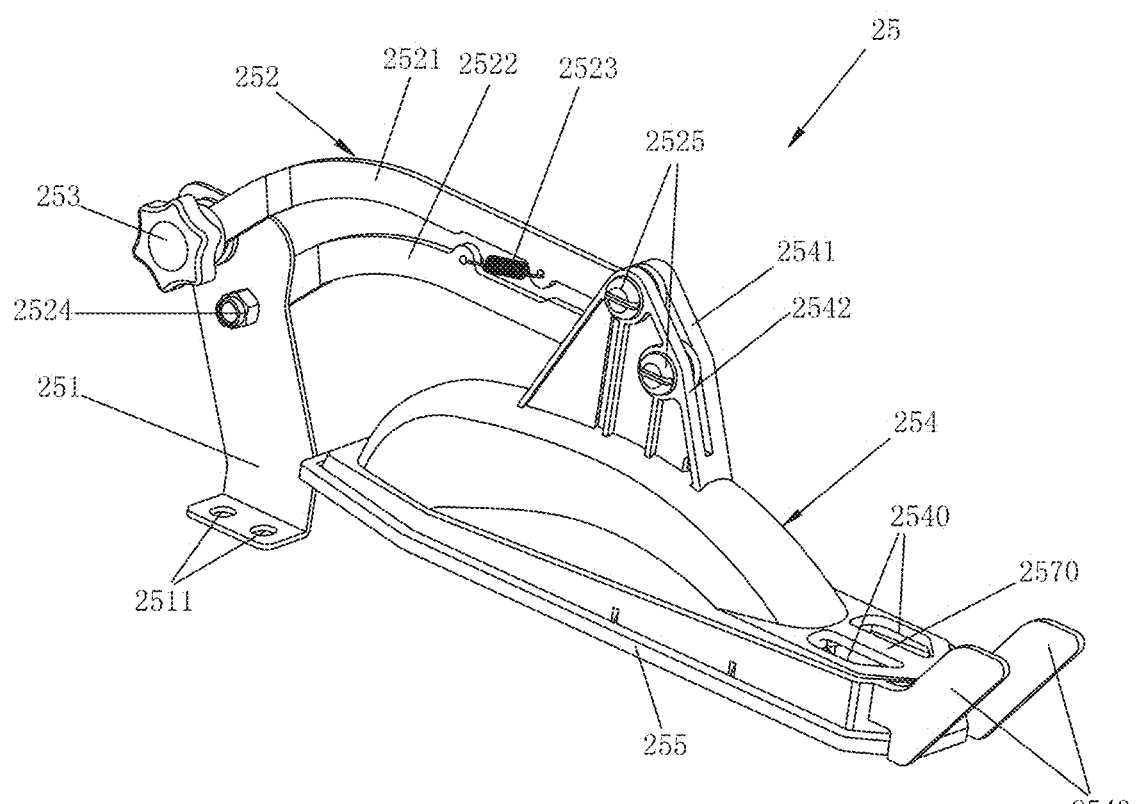
FIG. 4 is a schematic view of an exemplary guard assembly of the table saw.

As shown in FIG. 4, the guard assembly 25 comprises a riving knife 251, a link mechanism 252, a locking knob 253 and the guard element 254. A flexible ring 255 is mounted to the bottom of the guard element 254. The guard assembly 25 is mounted on the work table 22 or a component near the work table 22 by the riving knife 251. Specifically, the riving knife 251 is formed with mounting holes 2511 at its lower end, and bolts will pass through the mounting holes 2511 and engage with threaded holes on the working table 22 or the component near the working table 22, whereby the riving knife 251 and the whole guard assembly 25 are fixed to the working table 22 or the component near the working table 22.

The guard element 254 is connected with the riving knife 251 by the link mechanism 252, and can move upwards and downwards relative to the riving knife 251. The link mechanism 252 comprises a first connecting rod 2521, a second connecting rod 2522, and a spring 2523 connected between the first and second connecting rod 2521, 2522. A first mounting plate 2541 and a second mounting plate 2542 extend from the guard element 254, which are parallel to each other. A gap is formed between the first and second mounting plate 2541, 2542. A first end of each of the first and second connecting rod 2521, 2522 is connected to the upper end of the riving knife 251 respectively by a bolt 2524, and a second end of each of the first and second connecting rod 2521, 2522 is inserted into the gap and respectively connected to the first and the second connecting rod 2521, 2522 by a bolt 2525. The spring 2523 provides an acting force so that the guard element 254 will tightly abut against the work table 22 or the workpiece 20. In the non-working condition, as shown in FIG. 2, the guard element 254 tightly abuts against the work table 22, and due to the flexible ring 255, an enclosed chamber is formed between the guard element 254 and the working table 22. In the working condition, as shown in FIG. 7, at least a portion of the guard element 254 tightly abuts against the workpiece 20, and the workpiece 20 can move relative to the guard element 254. In other embodiments, the spring 2523 may be replaced by other elastic elements such as torsion spring or even be omitted. If the spring is omitted, the guard element 254 abuts against the work table 22 or the workpiece 20 under the action of gravity.

The locking knob 253 is connected to one of the bolts 2524 for fixing the guard element 254 at a certain position relative to the riving knife 251. In this embodiment, the locking knob 253 is connected to the bolt 2524 at the first end of the first connecting rod 2521. When the locking knob 253 is locked, the first connecting rod 2521 is fixed, and the guard element 254 is fixed at a certain height. When the locking knob 253 is released, the guard element 254 is operable of being moved upwards and downwards. In other embodiments, the locking knob 253 may also be connected to the bolt 2524 at the first end of the second connecting rod 2522.

As shown in FIG. 4, the guard element 254 is formed with a window 2540 at its front end, through which the operator can easily observe a cutting point. The cutting point herein refers to the contact point between the cutting edge of the blade and the workpiece. The window 2540 comprises a division plate 2570 dividing the window 2540 into two parts. The division plate 2570 is located above the cutting point and has a width greater than the thickness of the blade 24 so as to block debris from traveling towards the eyes of the operator. It should be noted that the shape and the number of the window may be changed according to the requirements as long as the cutting points can be observed easily.

Figure 8:
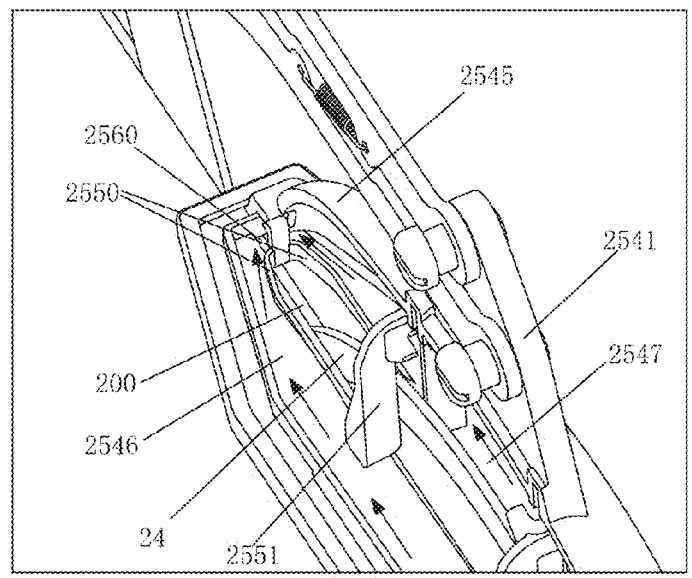
FIG. 8 is a partial enlarged view showing the inner structure of the guard assembly of FIG. 4.

The guard element 254 further comprises a guiding part 2543 at its front end. The guiding part 2543 extends toward the front of the guard element 254 obliquely and upwardly. In this embodiment, the guiding part 2543 includes two guiding ribs. As shown in FIG. 3, during the cutting operation, the workpiece 20 is placed on the work table 22, and then pushed toward the blade 24 by the operator. The workpiece 20 first contacts the guiding rib 2543 and then overcomes the acting force of the spring 2523 so that the guard element 254 is lifted and moved upwards, and finally the guard element 254 falls on the workpiece 20 and tightly abuts against the workpiece 20 under the action of the spring 2523. As shown in FIG. 7, if the workpiece 20 has not reached the backend of the guard element 254, a part of the bottom surface of the guard element 254 tightly abuts against the workpiece 20. As shown in FIG. 8, when the workpiece 20 reaches the backend of the guard element 254, the whole bottom surface of the guard element 254 tightly abuts against the workpiece 20.

Figure 9:
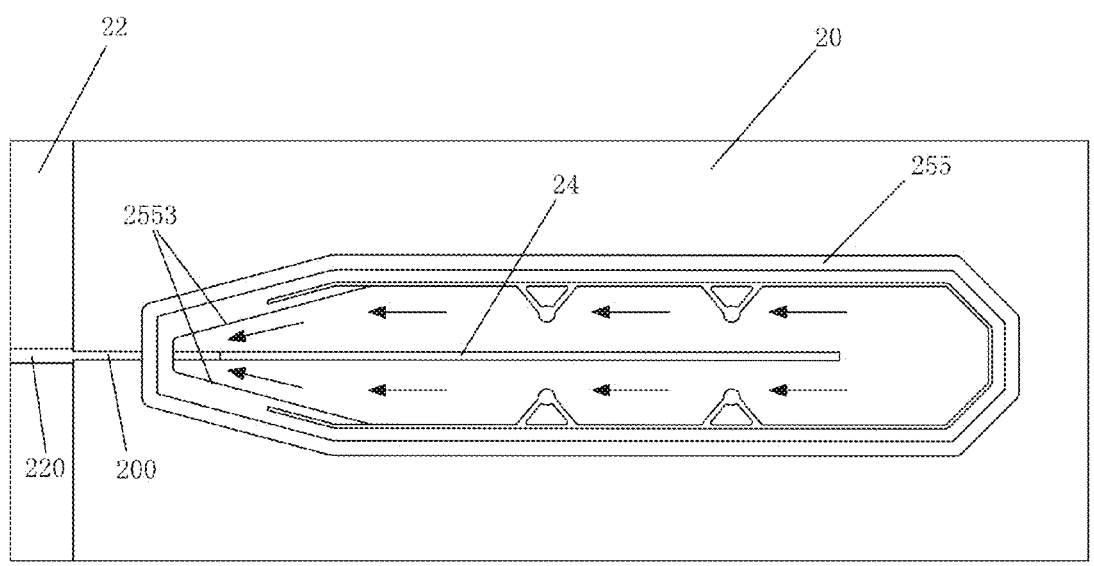
FIG. 9 is a schematic view showing an exemplary flexible ring of the guard assembly of FIG. 4 guiding the liquid.

As shown in FIG. 9, the flexible ring 255 comprises a guiding wall 2553 at its backend for guiding the flowing direction of the cooling liquid. The guiding wall 2553 has a front part and a rear part which is closer to the blade than the front part. Preferably, the guiding wall 2553 is a V-shaped inclined plane. Under the action of the spring 2523, the guiding wall 2553 abuts against the workpiece 20. Preferably, the flexible ring 255 is a rubber ring; in other embodiments, the flexible ring 255 may also be formed by other flexible materials such as felt, brush bristles, and so on.

Figure 5:
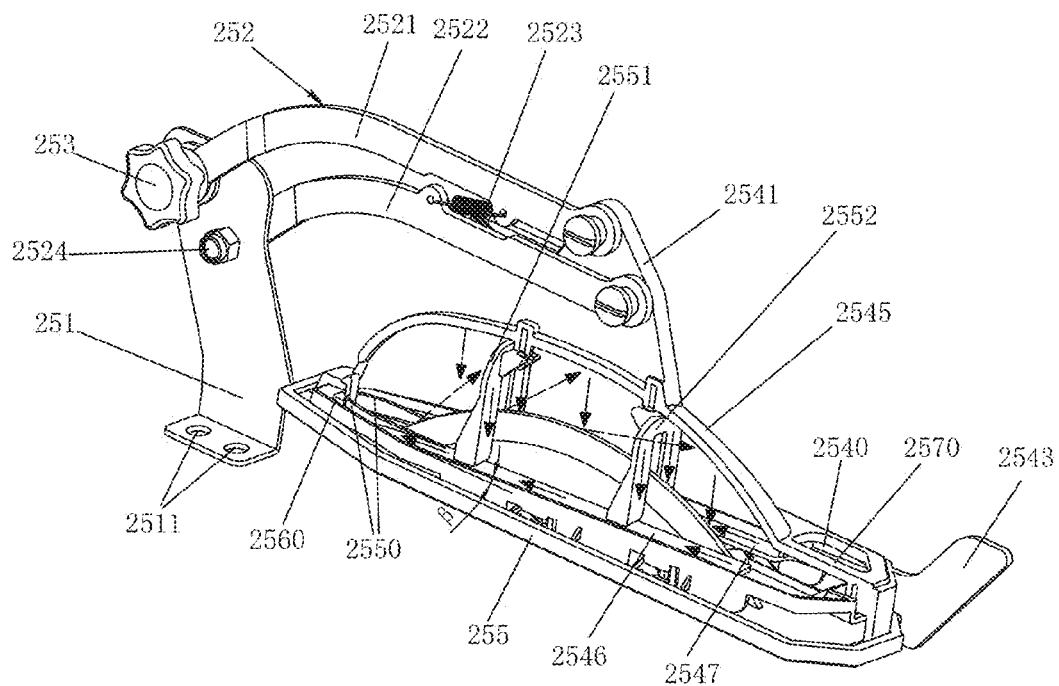
FIG. 5 is a schematic view showing the inner structure of the guard assembly of FIG. 4.

As shown in FIG. 5, the guard element 254 is generally configured as arc-shaped. As shown in FIG. 6, the guard element 254 has an arc-shaped section and an arc-shaped inside wall extending from a center area of the guard element 254 above the blade 24 towards two sides of the guard element 254 outwardly and downwardly. The guard element 254 comprises a first side wall 2544 and a second side wall 2545 opposite to each other. Thus, the guard element 254 is constituted to form a chamber therein. In FIG. 5, the first side wall 2544 is removed, thus the inner structure of the guard element 254 is clearly shown. A first guiding plate 2546 and a second guiding plate 2547 are respectively mounted on the lower part of the inner wall of the first side wall 2544 and the second side wall 2545, and each of the first guiding plate 2546 and the second guiding plate 2547 extends towards the backend of the guard element 254 obliquely and downwardly along the first side wall 2544 and the second side wall 2545, that is to say, the frontend of each of the first and second guiding plate 2546, 2547 is higher than the backend thereof, and the angle β between each of the first and second guiding plate 2546, 2547 and the horizontal plane is more than 1°. A space is formed between the first guiding plate 2546 and the second guiding plate 2547, through which the blade 24 can pass. In the sectional view as shown in FIG. 6, the first guiding plate 2546 and the second guiding plate 2547 forms a "splayed" shape. The configuration of the first guiding plate 2546 and the second guiding plate 2547 forms a first guiding channel 2548 and a second guiding channel 2549. Each of the first and second guiding channel 2548, 2549 comprises a first side adjacent to the blade 24 and a second side away from the blade 24 and coupled to the inside wall of the guard element 254, and the first side is higher than the second side in the vertical direction.

At the backend of the guard element 254, a discharging opening 2560 is formed between the first guiding plate 2546 and the second guiding plate 2547. The discharging opening 2560 substantially aligns with the blade 24 in the feeding direction, and communicates with the cutting opening 220. When the workpiece 20 is moved to the backend of the guard element 254 below the discharging opening 2560, the discharging opening 2560 communicates with a kerf 200 of the workpiece cut by the blade 24 and the cutting opening 220. Preferably, in the perpendicular direction, that is, in the direction perpendicular to the work table 22, the discharging opening 2560 substantially aligns with the cutting opening 220, and when the workpiece 20 moves to the back of the blade 24 below the discharging opening 2560, the discharging opening 2560 substantially aligns with the kerf 200 of the workpiece and the cutting opening 220. It should be noted by the person skilled in the art that the discharging opening 2560 may partly align with the kerf 200 of the workpiece and the cutting opening 220 or communicate with each other by additional guiding mechanisms.

A blocking plate 2550 is arranged in front of the discharging opening 2560. Since the first guiding channel 2548 and the second guiding channel 2549 become narrower gradually toward the back end thereof, the blocking plate 2550 can prevent the cooling liquid in the first and second guiding channel 2548, 2549 from flowing back to the workpiece 20.

A first baffle 2551 and a second baffle 2552 which are configured as reversed U-shaped are arranged within the guard element 254 for blocking the cooling liquid brought by the blade 24 into the guard element 254 and guiding the cooling liquid splashing to the first baffle 2551 and the second baffle 2552 into the first guiding channel 2548 and the second guiding channel 2549. The first baffle 2551 and the second baffle 2552 are respectively connected between the top in the guard element 254 and the first guiding plate 2546 and the second guiding plate 2547, and separated from the inner surfaces of the first side wall 2544 and the second side wall 2545 of the guard element 254. In other embodiments, the first baffle 2551 and the second baffle 2552 may only be connected to the inner surfaces of the first side wall 2544 and the second side wall 2545 of the guard element 254, or only connected to the first guiding plate 2546 and the second guiding plate 2547.

As shown in FIG. 7, the tank 23 for receiving the cooling liquid is filled with the cooling liquid. A portion of the blade 24 is immerged into the cooling liquid. A third baffle 231 is arranged at the back of the blade 24, and the lower end of the third baffle 231 is also immerged into the cooling liquid, and the upper end is laterally provided with a flexible body 232 extending towards the blade 24. A slot is cut in the flexible body 232 through which the blade 24 passes and directly contacts the flexible body 232. Preferably, the flexible body 232 is felt, and in other embodiments, the flexible body 232 may also be formed by other flexible materials.

The following will describe the working process of the cooling liquid guiding system.

In the working condition, the blade 24 is driven by the motor to rotate at high speed, and plenty of the cooling liquid may rotate with the blade 24. As shown by dashed arrows in FIG. 7, the dashed arrows indicate the splashing direction of the cooling liquid brought by the blade 24 from the tank 23 for receiving the cooling liquid. One part of the cooling liquid may be blocked by the flexible body 232 so as to fall into the tank 23 for receiving the cooling liquid, and the other part of the cooling liquid may splash through the gap between the flexible body 232 and the blade 24 and may be brought to the work table 22 by the blade 24 so as to cool the blade 24. Since the flexible body 232 directly contacts the cutting edge of the blade 24, the cooling liquid may be distributed on the cutting edge of the blade 24, thereby reducing the amount of the cooling liquid brought to the work table 22.

As shown by the dashed arrows in FIGS. 5-7, the cooling liquid brought to the work table 22 may enter into the guard element 254 along the tangential direction of the blade 24 and then splash to the inner surface of the guard element 254 and the first and second baffles 2551, 2552. As shown by the solid arrows in FIGS. 5-7, the solid arrows indicate the flowing direction of the blocked and collected cooling liquid. The cooling liquid splashed to the inside wall of the guard element 254 may flow into the first guiding channel 2548 and the second guiding channel 2549 along the inside wall, i.e., the inner surfaces of the first side wall 2544 and the second side wall 2545. Meanwhile, the cooling liquid splashed to the first baffle 2551 and the second baffle 2552 may be blocked by the first baffle 2551 and the second baffle 2552 and flow into the first guiding channel 2548 and the second guiding channel 2549 along the first baffle 2551 and the second baffle 2552. The cooling liquid collected in the first guiding channel 2548 and the second guiding channel 2549 may flow towards the tail end of the guard element 254 along the inclining direction of the first guiding channel 2548 and the second guiding channel 2549 and converge to the discharging opening 2560. Due to the blocking plate 2550 arranged at the discharging opening 2560, the cooling liquid at the discharging opening 2560 cannot flow back into the guard element 254. As shown in FIG. 7, if the workpiece 20 has not reached the back end of the guard element 254 below the discharging opening 2560, the discharging opening 2560 is substantially in line with the cutting opening 220 of the work table, thus the cooling liquid collected in the first guiding channel 2548 and the second guiding channel 2549 can be discharged from the discharging opening 2560, and fall into the tank 23 for receiving the cooling liquid through the cutting opening 220 of the work table. As shown in FIG. 8, when the workpiece 20 moves to the back end of the guard element 254 below the discharging opening 2560, the discharging opening 2560 is substantially in line with the kerf 200 of the workpiece and the cutting opening 220. Thus, the cooling liquid collected in the first guiding channel 2548 and the second guiding channel 2549 can be discharged from the discharging opening 2560 through the kerf 200 of the workpiece and the cutting opening 220 of the work table, and finally flow into the tank 23 for receiving the cooling liquid.

Although most of the cooling liquid brought into the guard element 254 by the blade 24 may be collected in the first guiding channel 2548 and the second guiding channel 2549, some cooling liquid cannot be collected in the first guiding channel 2548 and the second guiding channel 2549, but rather falls on the workpiece 20. As shown in FIG. 9, the cooling liquid which is not collected in the first guiding channel 2548 and the second guiding channel 2549 can be enclosed into the workpiece area covered by the guard element 254 via the flexible ring 255. As shown in the solid arrow in the figures, during the cutting operation, as the workpiece 20 is pushed towards the back end of the guard element 254, the cooling liquid in the workpiece area covered by the guard element 254 will be moved to the back end of the guard element 254 along with the workpiece 20, and this part of cooling liquid may be guided to the kerf 200 of the workpiece by the guiding wall 2553 of the flexible ring, and finally flow into the tank 23 for receiving the cooling liquid through the kerf 200 of the workpiece and the cutting opening 220 of the work table.

With the above cooling liquid guiding system, the cooling liquid brought by the blade 24 can be effectively controlled in the guard element 254 and then effectively collected and guided back to the tank 23 for receiving the cooling liquid, which can effectively avoid the cooling liquid from splashing to dirty the operator, the surroundings, and the workpiece while enhancing the comfort of the operator upon cutting the workpiece.

In other embodiments, the first guiding channel 2548 and the second guiding channel 2549 may be arranged outside of the guard element 254 and extend to the back end of the guard along the outer wall of the guard element 254 to form the discharging opening 2560. The cooling liquid collected in the first guiding channel 2548 and the second guiding channel 2549 may flow from the discharging opening 2560 to the tank 23 through the cutting opening 220 of the work table.

Figure 10:
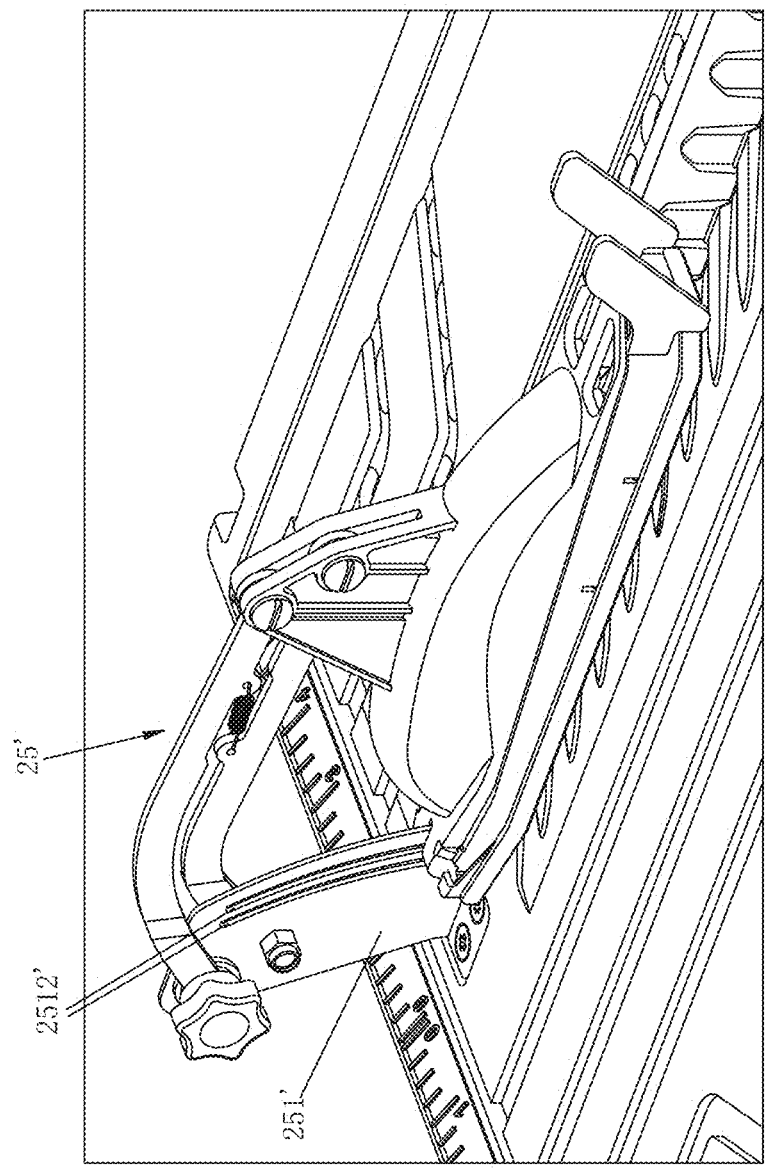
FIG. 10 is a schematic view of a further exemplary guard assembly.

FIG. 10 shows a second embodiment. This embodiment differs from the above described embodiment in that the riving knife 251' of the guard assembly 25' is formed with at least one guiding element 2512' for guiding the cooling liquid to the cutting opening. In the present embodiment, the guiding element is a guiding slot. Person skilled in the art may consider that the guiding element may be guiding rib or other structure that can guide the flowing direction of the cooling liquid. Preferably, the guiding slots 2512' are arc-shaped. Specifically, the shape of the guiding slots 2512' is the same as the moving track of the discharging opening, thus the discharging opening is communicated with the guiding slots 2512' during the whole cutting process. Therefore, when the guard element 254' is at different heights, the cooling liquid collected in the first and second guiding channels can flow to the guiding elements 2512' through the discharging opening, and then finally flow into the tank for receiving the cooling liquid through the kerf of the workpiece and the cutting opening of the work table. This embodiment can guide the cooling liquid collected in the guiding channels back to the tank more effectively.

Figure 11:
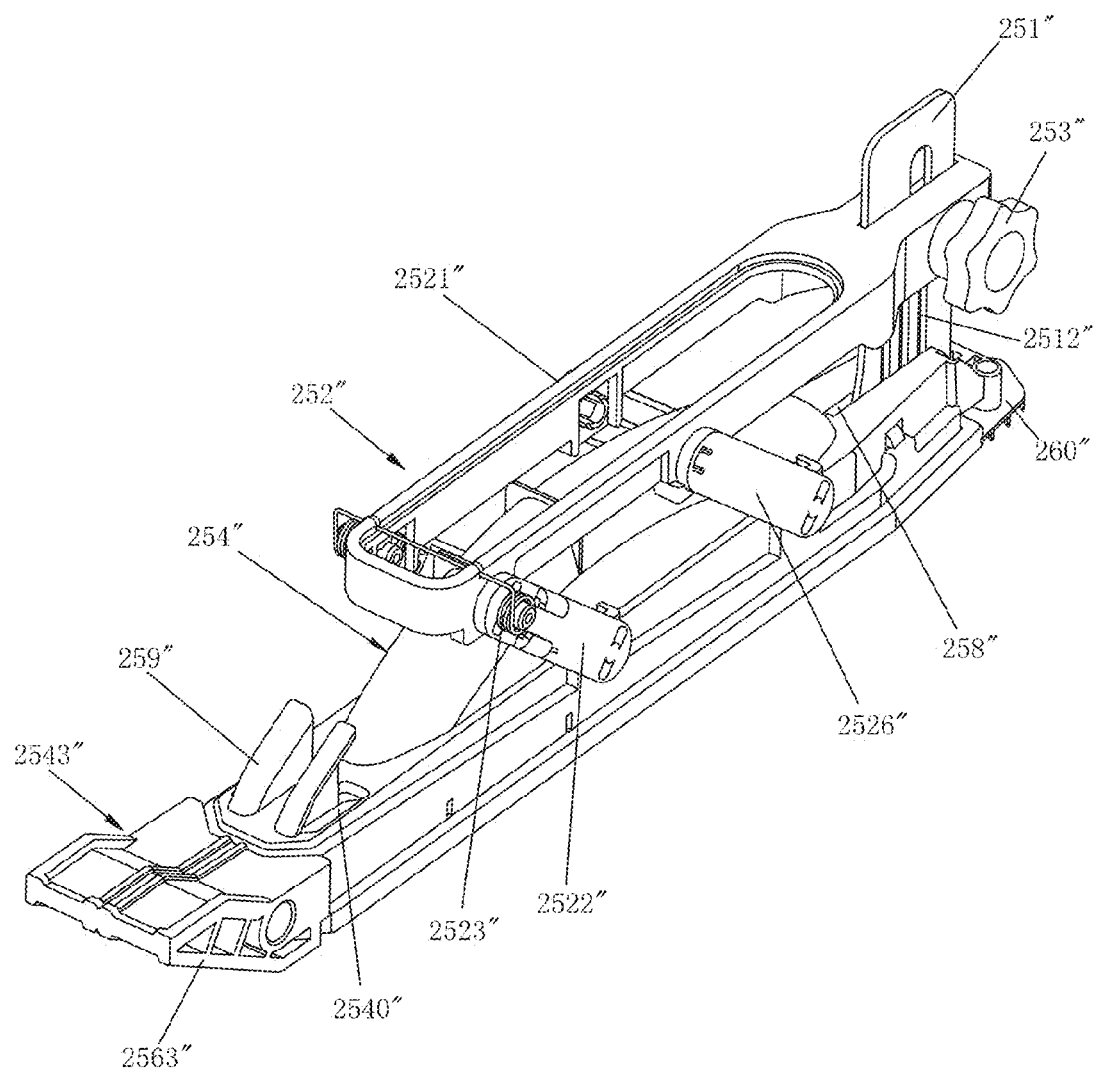
FIG. 11 is a schematic view of a still further exemplary guard assembly.
Figure 12:
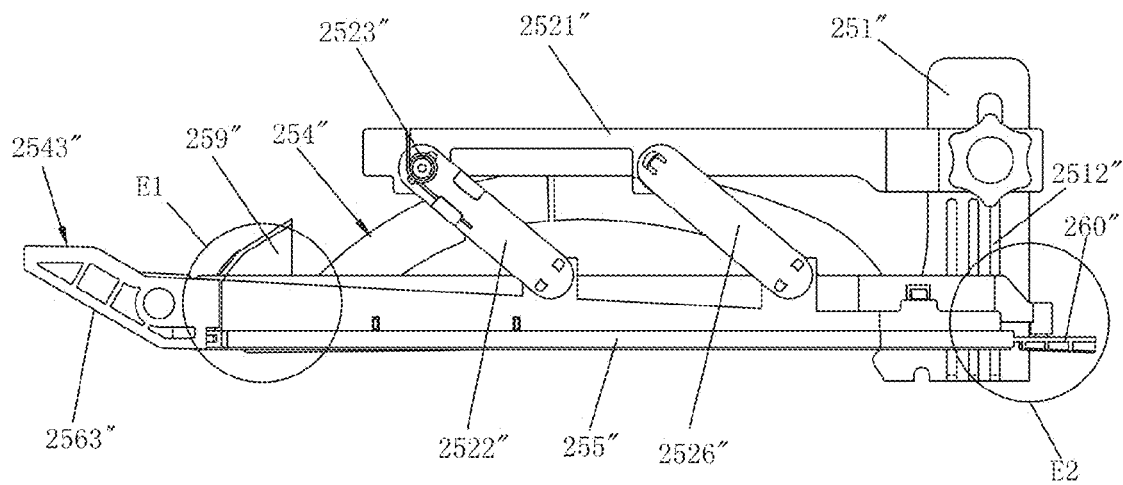
FIG. 12 is a front view of the guard assembly of FIG. 11.

FIGS. 11-15 show a third embodiment. As shown in FIGS. 11-12, in this embodiment, the back end of the guard element 254" is formed with an engaging slot 258" for engaging with the riving knife 251", and the riving knife 251" extends through the engaging slot 258". In the direction perpendicular to the plane of the blade, the width of the elongated slot 258" is slightly larger than the thickness of the riving knife 251". Preferably, in the direction parallel to the plane of the blade, the length of the elongated slot 258" is larger than the length of the riving knife 251". This design ensures that the guard element 254" cannot easily shake in the direction perpendicular to the plane of the blade and can move relative to the riving knife 251" in the direction parallel to the plane of the blade, thus the guard of this embodiment has good stability.

The guard element 254" is connected to the riving knife 251" by the link mechanism 252". The link mechanism 252" comprises a first connecting rod 2521", a second connecting rod 2522" and a third connecting rod 2526". One end of the first connecting rod 2521" is mounted to the riving knife 251" in a cantilever form by the locking knob 253", and located above the guard element 254". The first end of each of the second connecting rod 2522" and the third connecting rod 2526" is pivotally connected to the first connecting rod 2521", and the second end opposite to the first end is pivotally connected to the side wall of the guard element 254". The first end of the second connecting rod 2522" is pivotally connected to the front end of the first connecting rod 2521", and the first end of the third connecting rod 2526" is pivotally connected to the middle part of the first connecting rod 2521". Preferably, there are two second connecting rods 2522" and two third connecting rods 2526". The two second connecting rods 2522" and the two third connecting rods 2526" are respectively arranged on the two sides of the guard element 254". The spring 2523" acts on the second connecting rods 2522" for restoring the guard element 254". In this embodiment, the spring 2523" is arranged between the first connecting rod 2521" and the first end of the second connecting rod 2522" for the restoration of the guard element. It should be conceived by the person skilled in the art that the spring 2523" may also acts on the third connecting rod 2526", or the guard element 254".

When the first connecting rod 2521" is fixed on the riving knife 251" by the locking knob 253", the link mechanism 252" enables the guard element 254" to move relative to the riving knife 251" parallel to the plane of the blade, i.e., in the feeding direction of the blade and the perpendicular direction, thereby lifting and dropping the guard element 254".

In this embodiment, the guiding part 2543" at the front end of the guard element 254" comprises a guiding board 2563" which extends obliquely and upwardly toward the front of the guard element 254" in the direction parallel to the plane of the blade and extends from one side of the blade to the other in the direction perpendicular to the plane of the blade. The configuration of the guiding board 2563" can enhance the ability of angle cutting of the table saw. During the angle cutting operation, once the workpiece contacts the guiding part 2543", the guard element 254" will move upwards, that is, raises under the action of the pushing force of the operator.

Figure 13:
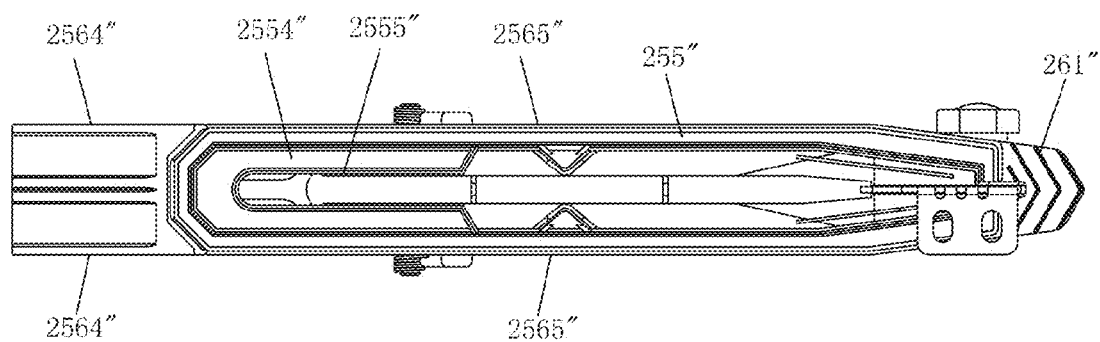
FIG. 13 is a bottom view of the guard assembly of FIG. 11.

In the direction perpendicular to the plane of the blade, at least one outmost edge at a side of the guiding part 2543" is located outside of or flush with the outmost edge at the same side of the guard element 254". As shown in FIG. 13, in the direction perpendicular to the plane of the blade, both of the two outmost edge 2564" of the guiding part 2543" flush with the two outmost edge 2565" of the guard element 254". Specifically, in the direction perpendicular to the plane of the blade, the two outmost edges 2564" of the guiding part 2543" are the two edges of the guiding board 2563", and the two outmost edges 2565" of the guard element 254" are the two edges at the bottom of the guard element 254". At least one side of the guiding part is outside of or flush with the side of the guard element, and the workpiece positioned slantways touches the side of the guiding part first while making bevel cutting, therefore, the guard element will move upwards under the action of the pushing force of the operator without lifting the guard element 254" manually.

Further, a blocking element 259" is additionally disposed at the window 2540" on the front end of the guard element 254" for preventing the debris produced during the cutting operation flying toward the operator. The blocking element 259" extends towards the back of the guard element 254" upwardly and obliquely. The extending direction of the blocking element 259" is opposite to that of the guiding board 2563".

Figure 14:
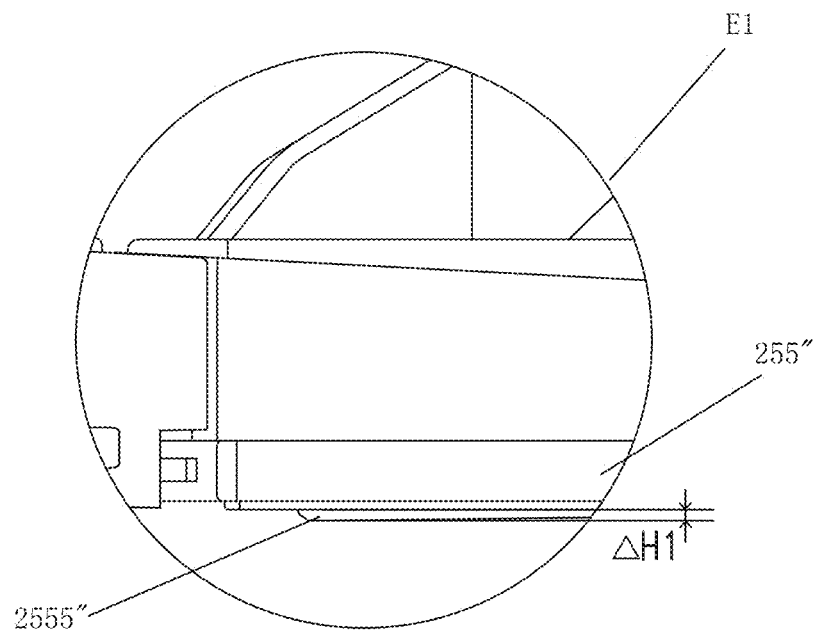
FIG. 14 is a partial enlarged view of the portion E1 of FIG. 12.

In order to better control the cooling liquid in the guard element 254" and prevent the cooling liquid from flowing through the front end of the guard element 254", a flexible liquid retainer 2554" is disposed at the front part of the flexible ring 255". The flexible liquid retainer 2554" extends from the inner wall of the flexible ring towards the blade, and can be configured as U-shaped to surround part of the blade. The flexible liquid retainer 2554" forms a retaining edge 2555" which is closer to the blade than other parts of the flexible liquid retainer 2554", i.e., the inner edge of the U-shaped flexible liquid retainer 2554". As shown in FIG. 14, the retaining edge 2555" protrudes from the bottom surface of the flexible ring 255" and then a height difference ΔH1 is formed there between. This design has an advantage in that during the cutting process, the guard element 254" is lifted under the action of the pushing action of the workpiece and falls on the surface of the workpiece. Under the action of gravity of the guard element 254" and the spring 2523", the flexible ring 255" and the retaining edge 2555" abut against the surface of the workpiece. Since the part of the flexible liquid retainer 2554' from the inner wall of the flexible ring 255" to the retaining edge 2555" is deformed, a force is exerted to the retaining edge 2555" so that the retaining edge 2555" tightly abuts against the surface of the workpiece. Therefore, the cooling liquid is blocked in the chamber formed together by the guard element 254" and the workpiece through the retaining edge 2555", which effectively prevents the cooling liquid from flowing out of the front end of the guard element 254" so as to remain on the surface of the workpiece.

Figure 15:
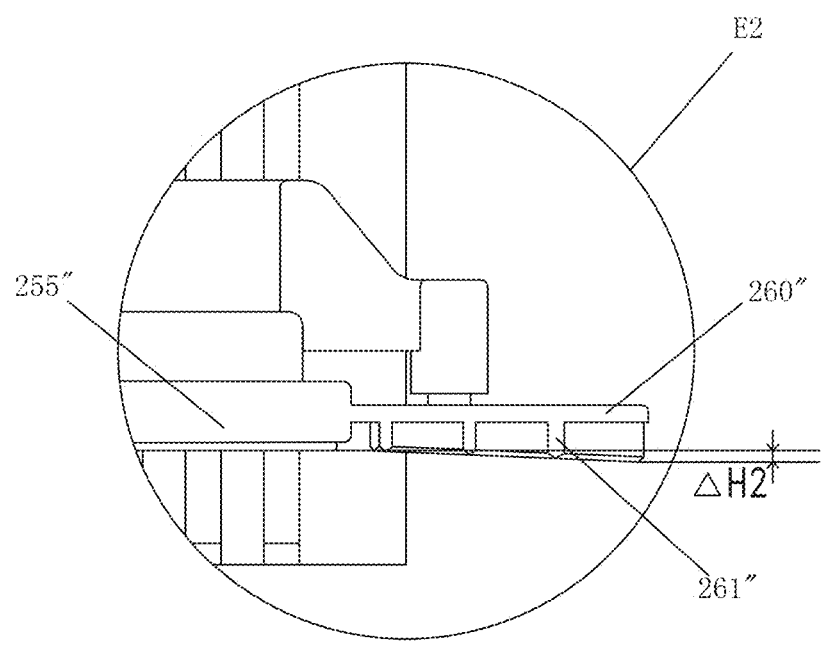
FIG. 15 is a partial enlarged view of the portion E2 of FIG. 12.

In order to prevent the cooling liquid from moving towards the back of the guard with the workpiece together and remaining on the surface of the workpiece during the cutting process, the guard assembly 25" further comprises a flexible wiper 260" for wiping the cooling liquid to the kerf of the workpiece so as to flow back to the tank for receiving the cooling liquid. The flexible wiper 260" is arranged at the back end of the guard element 254" and abuts against the surface of the workpiece. The flexible wiper 260" and the flexible ring 255" may be formed in one piece, or formed separately and then connected together, or used separately. As shown in FIG. 15, the flexible wiper 260" protrudes from the bottom surface of the guard element 254" and then a height difference ΔH2 is formed therebetween. Preferably, the flexible wiper 260" has a V-shaped wiping rib 261" at the side facing to the workpiece. The opening of the wiping rib 261" faces to the blade, and the wiping rib 261" protrudes from the bottom surface of the guard element 254". This design has an advantage in that during the cutting process, the guard element 254" falls on the surface of the workpiece, and under the action of gravity of the guard element 254" itself and the spring 2523", the wiping rib 261" tightly abuts against the surface of the workpiece. When the operator pushes the workpiece towards the blade, the workpiece is cut by the blade and moves towards the back end of the guard element 254", and the wiping rib 261" can wipe the cooling liquid on the surface of the workpiece to the guiding plate 251', thereby effectively preventing the cooling liquid from flowing away from the back end of the guard element 254" so as to remain on the surface of the workpiece which has been cut.

With the liquid retainer and the wiper arranged on the front end and the back end of the guard, respectively, this embodiment can effectively prevent the cooling liquid from flowing away from the front end and the back end of the guard so as to retain on the surface of the workpiece, and also control the cooling liquid within the guard element better to ensure the cleanness of the surface of the workpiece.

The cooling liquid guiding system of the table saw is not to be limited to the structures indicated by the contents of the above embodiments and drawings. Rather, obvious changes, replacements and modifications for the shape and position of the members based on this disclosure are to be considered as falling within the protection scope of the invention as defined by the following claims.

What is claimed is:

1. A table saw comprising:
   a base;
   a work table, for carrying a workpiece, supported on the base, the work table having a cutting opening;
   a tank for accommodating a cooling liquid arranged below the work table;
   a blade, driven by a motor, which partially extends out from the cutting opening; and
   a guard assembly operably mounted to the work table via a link mechanism, the guard assembly comprising a guard element for covering at least a portion of the blade and movable between a first position wherein the guard element abuts the work table when the work table does not carry the workpiece and a second position for abutting against the workpiece when the workpiece is carried by the work table, wherein the link mechanism causes a bottom edge of the guard element to remain substantially parallel to the work table when in both the first position and the second position, the link mechanism comprising a first connecting rod and a second connecting rod, each of the first connecting rod and the second connecting rod being operably coupled to the work table and the guard assembly, and a biasing element connected between the first connecting rod and the second connecting rod, and wherein the guard element comprises:
   an inside wall extending from a center area above the blade to both sides of the guard element outwardly and downwardly;
   a cooling liquid guiding channel extending along a lower portion of the guard element and descending towards a backend of the guard element, the cooling liquid channel being above the bottom edge of the guard element and tilted relative to the bottom edge;
   a discharging opening communicating with the cooling liquid guiding channel, the discharging opening allowing the cooling liquid to flow away from the guard element and back into the tank through the cutting opening, and
   at least one baffle for blocking the cooling liquid brought by the blade into the guard element and guiding the cooling liquid into the cooling liquid guiding channel located between a top of the guard element and the cooling liquid guiding channel, the baffle defining a general U-shape comprising two legs respectively located on two sides of the blade, and wherein a gap is formed between each leg and the blade in a width direction of the blade.

2. The table saw according to claim 1, wherein the discharging opening is located at the backend of the guard element.

3. The table saw according to claim 2, wherein the discharging opening substantially aligns with the blade in a feeding direction of the workpiece, and substantially aligns with the cutting opening in a vertical direction.

4. The table saw according to claim 3, wherein, when the workpiece is moved to the backend of the guard element, the discharging opening, a kerf of the workpiece, and the cutting opening are substantially in alignment.

5. The table saw according to claim 1, wherein the cooling liquid guiding channel comprises a first side adjacent to the blade and a second side away from the blade and coupled to the inside wall, and the first side is higher than the second side in a vertical direction.

6. The table saw according to claim 1, wherein the guard assembly comprises a riving knife connected to the guard element and associated with the work table.

7. The table saw according to claim 6, wherein the guard element is formed with an engaging slot for engaging with the riving knife, and the riving knife is extended through the engaging slot.

8. The table saw according to claim 7, wherein the riving knife is formed with at least one guiding element communicating with the discharging opening and the cutting opening.

9. The table saw according to claim 6, wherein the guard assembly comprises a locking knob mounted on the riving knife, and the guard element is capable of being locked at a certain position relative to the riving knife by the locking knob.

10. The table saw according to claim 1, wherein the guard element comprises at least one window for observing a cutting point which is arranged in a frontend of the guard element.

11. The table saw according to claim 10, wherein the window is provided with a blocking element for preventing the debris produced during the cutting operation flying towards the operator which is extended towards the backend of the guard element obliquely and upwardly.

12. The table saw according to claim 1, wherein the guard element comprises a guiding part, and at least one outmost edge at a side of the guiding part is located outside of or flush with the outmost edge at a same side of the guard element.

13. The table saw according to claim 12, wherein the guiding part comprises a guiding board extending towards a front of the blade obliquely and upwardly in a direction parallel to a plane of the blade and extending from one side of the blade to another side of the blade in a direction perpendicular to the plane of the blade.

14. The table saw according to claim 1, wherein the guard element comprises a flexible ring, mounted to a bottom of the guard element, which comprises a guiding wall for guiding the cooling liquid, and the guiding wall has a front part and a rear part which is closer to the blade than the front part.

15. The table saw according to claim 14, wherein a flexible liquid retainer is coupled to the front part of the flexible ring, which is extended from an inner wall of the flexible ring towards the blade so as to form a retaining edge enclosing a part of the blade, and the retaining edge protrudes from a bottom surface of the flexible ring.

16. The table saw according to claim 1, wherein at least one wiper is disposed at the backend of the guard element and covers a kerf of the workpiece, and at least a part of the wiper protrudes from a bottom surface of the guard element.

17. The table saw according to claim 16, wherein the wiper comprises at least one wiping rib comprising a front end adjacent to the blade and a back end distal from the blade, and the back end is closer to the kerf of the workpiece than the front end, and the wiping rib protrudes from the bottom surface of the guard element.

18. The table saw according to claim 1, wherein a flexible body is disposed under the work table, which contacts with the blade directly.

* * * * *